US 7,469,182 B2

United States Patent
Huang et al.

(12) United States Patent
Huang et al.

(10) Patent No.: US 7,469,182 B2
(45) Date of Patent: Dec. 23, 2008

(54) INTELLIGENT GEOCODING OF LOCATION INFORMATION

(75) Inventors: Haitao Huang, Gilbert, AZ (US); Liu Kungwel, Chandler, AZ (US); Hang-Ying Mao, Jiangsu (CN); Feng Tang, Jiangsu (CN)

(73) Assignee: Motorola, Inc., Schaumburg, IL (US)

(*) Notice: Subject to any disclaimer, the term of this patent is extended or adjusted under 35 U.S.C. 154(b) by 796 days.

(21) Appl. No.: 10/850,122

(22) Filed: May 20, 2004

(65) Prior Publication Data
US 2005/0261823 A1    Nov. 24, 2005

(51) Int. Cl.
*G01C 21/00* (2006.01)
(52) U.S. Cl. .......................................... 701/200; 707/2
(58) Field of Classification Search ......... 701/200–209; 715/512, 517; 707/2–8; 702/2
See application file for complete search history.

(56) References Cited

U.S. PATENT DOCUMENTS

| 5,796,634 | A | 8/1998 | Craport et al. |
| 6,565,610 | B1* | 5/2003 | Wang et al. .................. 715/517 |
| 6,934,634 | B1* | 8/2005 | Ge ................................ 702/2 |
| 7,117,199 | B2* | 10/2006 | Frank et al. .................... 707/3 |
| 7,158,878 | B2* | 1/2007 | Rasmussen et al. ......... 701/208 |
| 2003/0225725 | A1 | 12/2003 | Millier et al. |

* cited by examiner

*Primary Examiner*—Richard M. Camby
(74) *Attorney, Agent, or Firm*—Roland K. Bowler, II

(57) ABSTRACT

A geocoding method including receiving input location information (212) for a particular location, decomposing (210) and purifying (220) the input information before decomposing (230) the information, and generating (240) multiple candidate locations based on components of the decomposed information, and then normalizing the candidate locations before comparing the candidate locations with information in a location information database.

19 Claims, 6 Drawing Sheets

INTELLIGENT GEOCODING OF LOCATION INFORMATION

FIELD OF THE DISCLOSURE

The present disclosure relates generally to geocoding, and more particularly to methods and processes for matching user input location information, for example, street address information, to database map information, for example, to obtain geographical coordinates like latitude and longitude coordinates from street address information input by a user, and methods.

BACKGROUND OF THE DISCLOSURE

Geocoding is a process for translating common street address information such as "200 North 1st Avenue, Phoenix, Ariz." or "Main St and 31st AVE, Tempe, Ariz." into geographical coordinates, i.e., latitude and longitude coordinates. The process normally involves searching and correlating street and/or address information input by a user with reference map data. However, users may enter the same street/address information in many different formats, none of which may be recognized by or correspond to the reference map data. For example, "Highway 87" in Arizona can be entered as "State Road 87", "Arizona State Highway 87", "SR 87", or by using some other variant, whereas the reference map may reference the road or street as only as "AZ-87". Furthermore, different reference maps may format the same data differently, for example, "AZ-87" could also be known as "HWY 87". In addition, street address location identifier formats vary from country to country. In the United States of America, for example, the street number is in front of the street name, but in France and other countries this ordering is reversed. The use of different street/address information formats results in inconsistent and/or unsuccessful geocoding results.

Existing geocoding processes adopt one of several tactics in the absence of an exact match between user input address/street information and reference map data. It is known, for example, to attempt to match abbreviations of words such as "Street" and "St", "Boulevard" and "BLVD", "Highway" and "HWY", etc. It is also known to use Soundex or other string-pattern matching techniques to resolve street/address information to an approximate match, sometimes providing a confidence level based on the "proximity" thereof. These tactics may address some issues such as typographical errors and the use of abbreviations. However, the tactics are not sufficiently intelligent to address the fundamental issues of mismatch between the user input address format and the reference map data format. For example, the above techniques can hardly resolve "Arizona State highway 87" to "AZ-87", or "1289 LOOP 410 SW" to "1289 SW I-410-LOOP".

The various aspects, features and advantages of the disclosure will become more fully apparent to those having ordinary skill in the art upon careful consideration of the following Detailed Description thereof with the accompanying drawings described below.

DETAILED DESCRIPTION

Geocoding entities generally translate common location information, for example, address information such as "200 North 1st Avenue, Phoenix, Ariz." or "Main St and 31st AVE, Tempe, Ariz," into some other location format, for example, latitude and longitude coordinates. In other applications, the geocoding entity provides location information in some other format, for example, in a proprietary format, or a particular common form.

Figure 1:
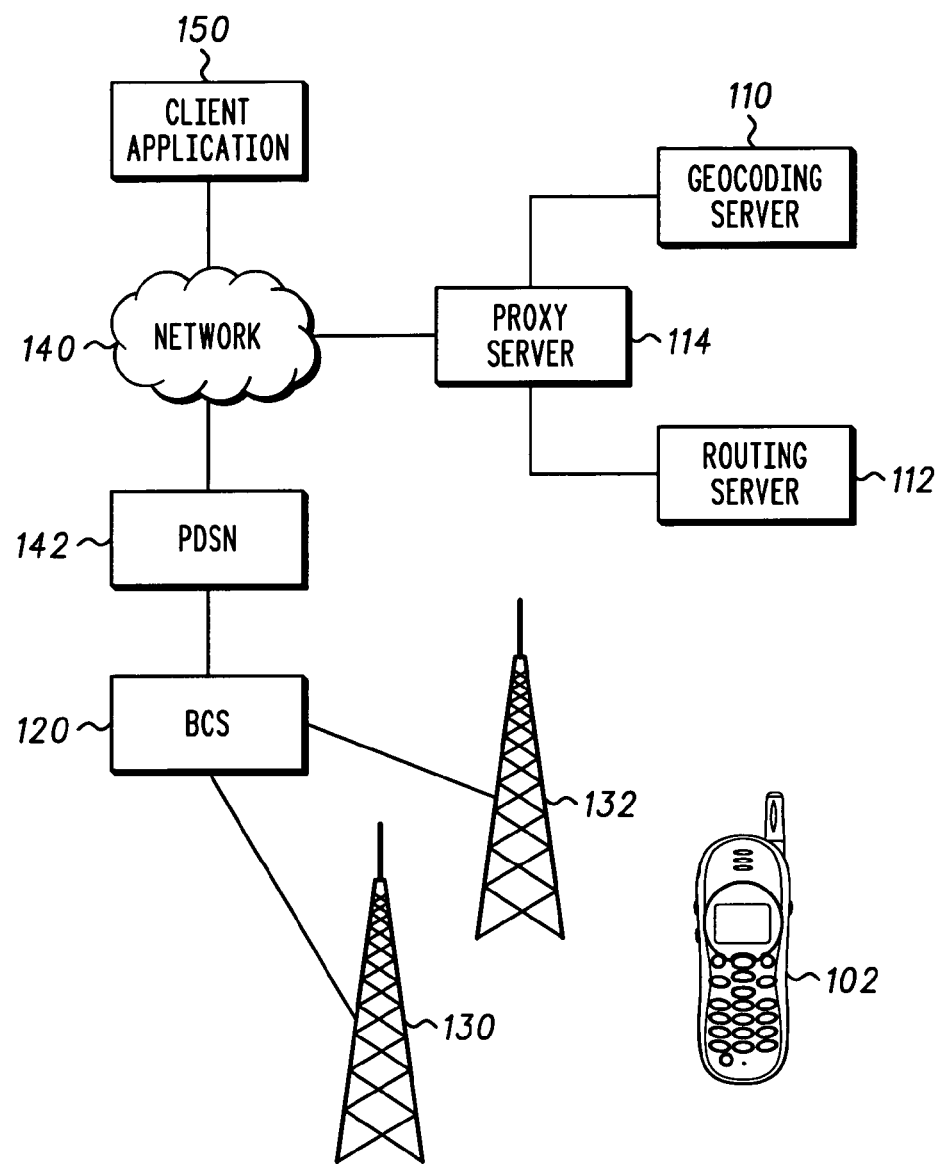
FIG. 1 is an exemplary communications architecture including a geocoding entity.

In the exemplary communications architecture 100 of FIG. 1, a geocoding server 110 provides location information in a specified format to a routing entity 112 via a proxy server. The exemplary geocoding server 110 receives location information in a first format, for example, common street name and address information input by a user, and converts the received location information to a second format, for example, latitude and longitude coordinates, which are communicated to the routing entity either directly or via the proxy server. In the exemplary routing application, the routing entity performs route planning based on received latitude and longitude coordinate information and provides routing information, which is communicated to a client, for example, via the proxy server. In other embodiments, the geocoding and routing functionality are collocated at the same entity or server.

The exemplary architecture of FIG. 1 also comprises a wireless communication network including a base controller station 120 coupled to multiple base transceiver stations 130 and 132. In one embodiment, the exemplary wireless communication network is a CDMA communication network, for example, a $3^{rd}$ Generation Partnership Project (3GPP2) CDMA 2000. network In other embodiments the wireless communication network is a Global System for Mobile Communications (GSM)/General Packet Radio Service (GPRS) communications network, or $3^{rd}$ Generation Partnership Project (3GPP) Universal Mobile Telecommunications System (UMTS) communication network, or a future generation network. The exemplary wireless communication network is coupled to a packet network 140, for example, a Transmission Control Protocol (TCP) Internet Protocol (IP) network by a Packet Data Serving Node (PDSN) 142. The exemplary wireless network is also coupled to the proxy server.

A wireless station, for example, a cellular telephone handset 102, wireless enabled computer, or personal communicator, or a wireless enabled navigator in an automobile running a navigation or route planning application receives user location input information, for example, present location and destination location. The user location input information, in a first format, is communicated to the geocoding entity where it is processed, as discussed further below. In the exemplary route planning application, the geocoding entity provides the processed location information to the routing entity, which performs route planning and provides routing information to the wireless station. In other route planning embodiments, another client, for example, an Internet subscriber 150, runs a navigation or route planning application. In the alternative embodiment, the client 150 communicates user input location information to the geocoding server 110 and receives routing information from the routing server 112 via the network 140 and proxy server 114.

In other embodiments, geocoding is performed by a geocoding entity for purposes other than navigation or routing planning. For example, the geocoding entity and functionality may be part of business processes that geocode mailing address or other location information to gain insight into geographic markets and/or customer distribution information. Geocoding may also be used as part of systems or processes to locate points of interest or traffic around a particular location, and also as part of any location-based application that requires parsing and normalizing human entered street addresses to a particular format.

Figure 2:
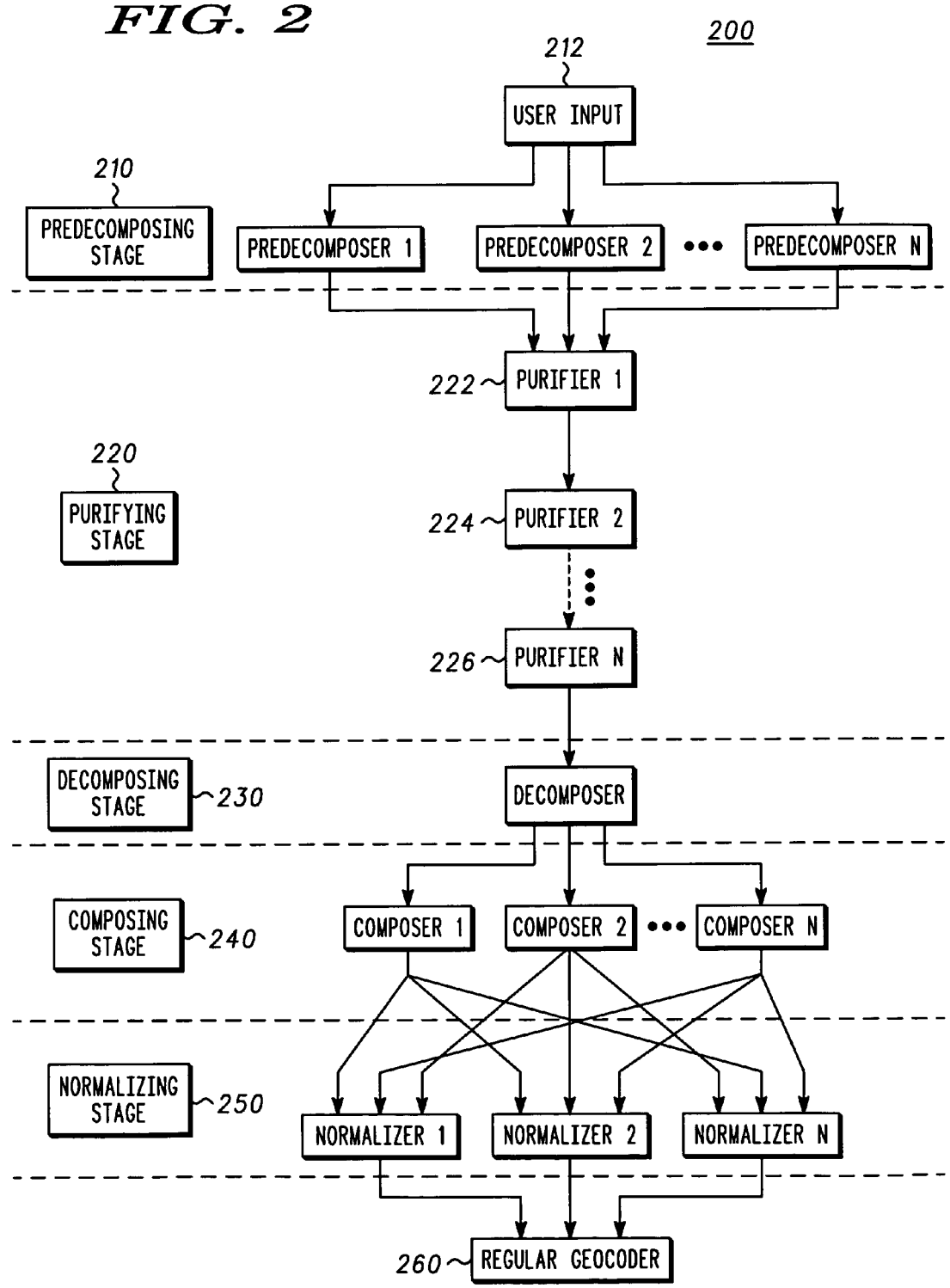
FIG. 2 is an exemplary geocoding process flow diagram.

FIG. 2 illustrates an exemplary geocoding process flow diagram 200. According to the exemplary process or method of FIG. 2, at 210, location information in a first format is subject to pre-decomposition. The exemplary location information is user input location information 212, although more generally this information could be obtained from some other source, for example, it could be machine generated input. At the pre-decomposer stage, street number information is separated from other information, for example, the street name portion of an address string. Thus generally the individual fields or components of an address must be identified.

In the United States, for example, street addresses may contain house number, pre-directional, street name, street type, and post-directional, secondary unit number (apartment, suite, building, etc.) information, though not all addresses include all of the exemplary fields. Other address fields may also exist. Some exemplary formats include: those having hyphenated address ranges, which are prevalent in New York City, for example: "112-10 BRONX RD"; Grid Style Addresses containing punctuation, for example, "39.2 RD, 39.4 RD"; Grid style addresses that include multiple directions, for example, "842 E 1700 S", where E is a pre-directional, S is a post directional, and 1700 is located in the primary name field; Alphanumeric Combinations of address ranges, for example, "N6W23001 BLUEMOUND RD"; Fractional house numbers, such as "123½ MAIN ST"; and Fractional street names such as "123 69½ St". These exemplary address formats are not intended to limit the disclosure, as the processes disclosed herein are applicable to many different street numbers and location identification formats.

In some embodiments, the location information is subject to a purifying stage. In the exemplary illustration, the pre-decomposed location information is subject to a purification stage 220. The purification stage processing includes the removal of information from the input location information that is not supported by the database location information. Exemplary information that may not be supported by the map data includes characters such as apostrophes, periods, quotations, etc. The purification processing may be performed on both the numerical and non-numerical portions of the input information, although in some embodiments purification may be performed on only one or the other of the components. In FIG. 2, the N purification sub-stages 222, 224, and 226 are indicative of different levels of filtering or removal of different characters from the input information.

In FIG. 2, at the decomposing stage 230, the different components of the input location information are identified after purification. In the exemplary embodiment where the numerical and non-numerical or descriptive portions of the input information are separated, the decomposing may be performed on only the non-numerical or descriptive portion of the input information after any purifying that may have been performed. The decomposing process is essentially the identification of the individual components or fields or words in the remaining purified input location information or the input address string after the street number information is extracted at pre-decomposing stage. For example, the remaining part of a United States street address after decomposing and purifying may contain pre-directional, street name, street type, and post-directional, secondary unit number (apartment, suite, building, etc.).

Figure 3:
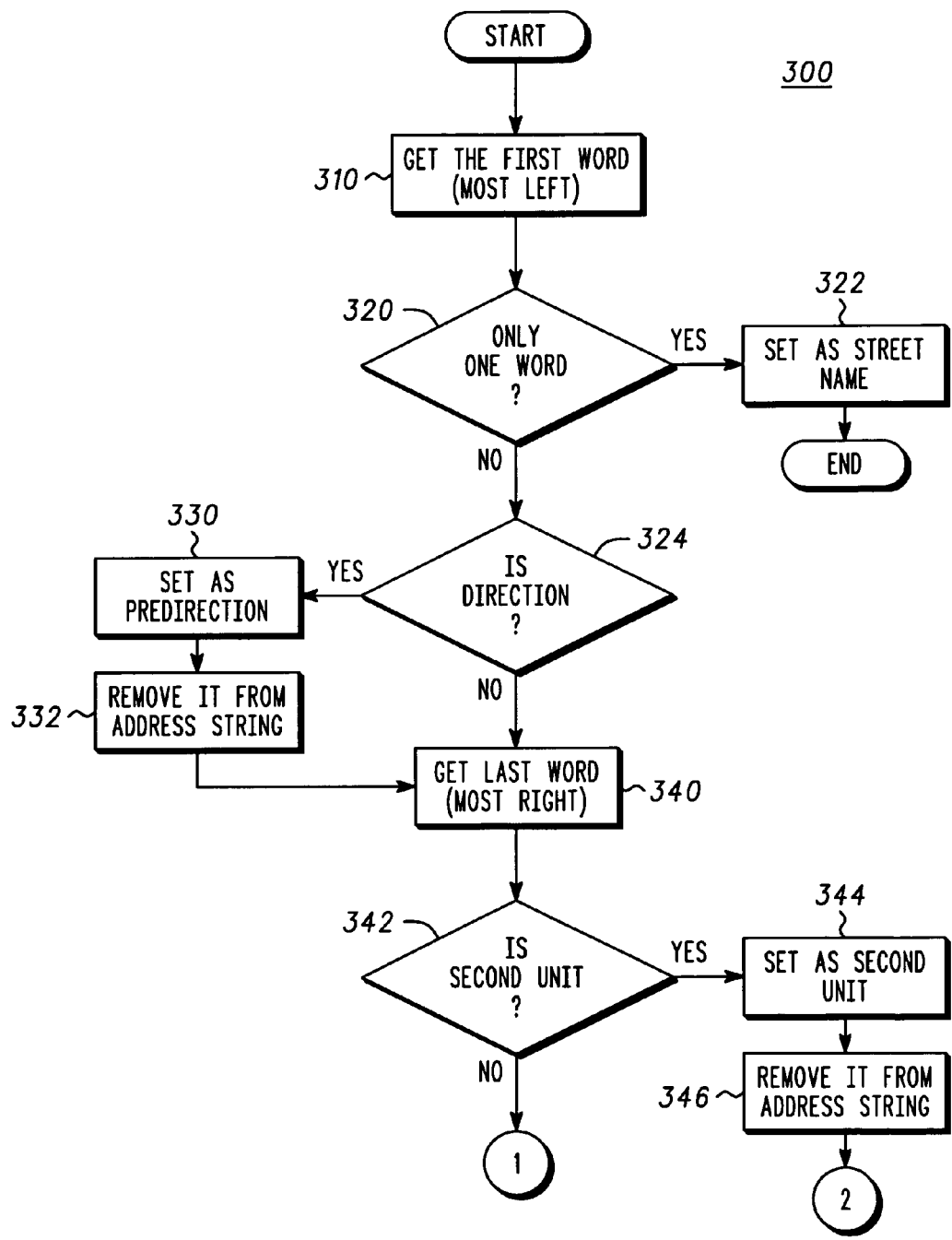
FIG. 3 is an exemplary decomposer process flow diagram.

In the exemplary de-composing flow chart 300 of FIG. 3, at block 310, the first word, for example, the leftmost word is identified. If there is only one word, determined at block 320 the single word is set as the location, for example, the street name, at block 322. If there are additional words as determined at block 320, then a determination is made as to whether there is directional information at block 324. If there is directional information, the directional information is set as pre-directional information at block 330 and it is removed from the address string at block 332. At block 340, the last word, for example, the rightmost word, is obtained. If it is identified as a secondary unit number at block 342, then the secondary unit is set at block 344 and removed from the address string at block 346. The decomposing process continues in FIG. 4.

Figure 4:
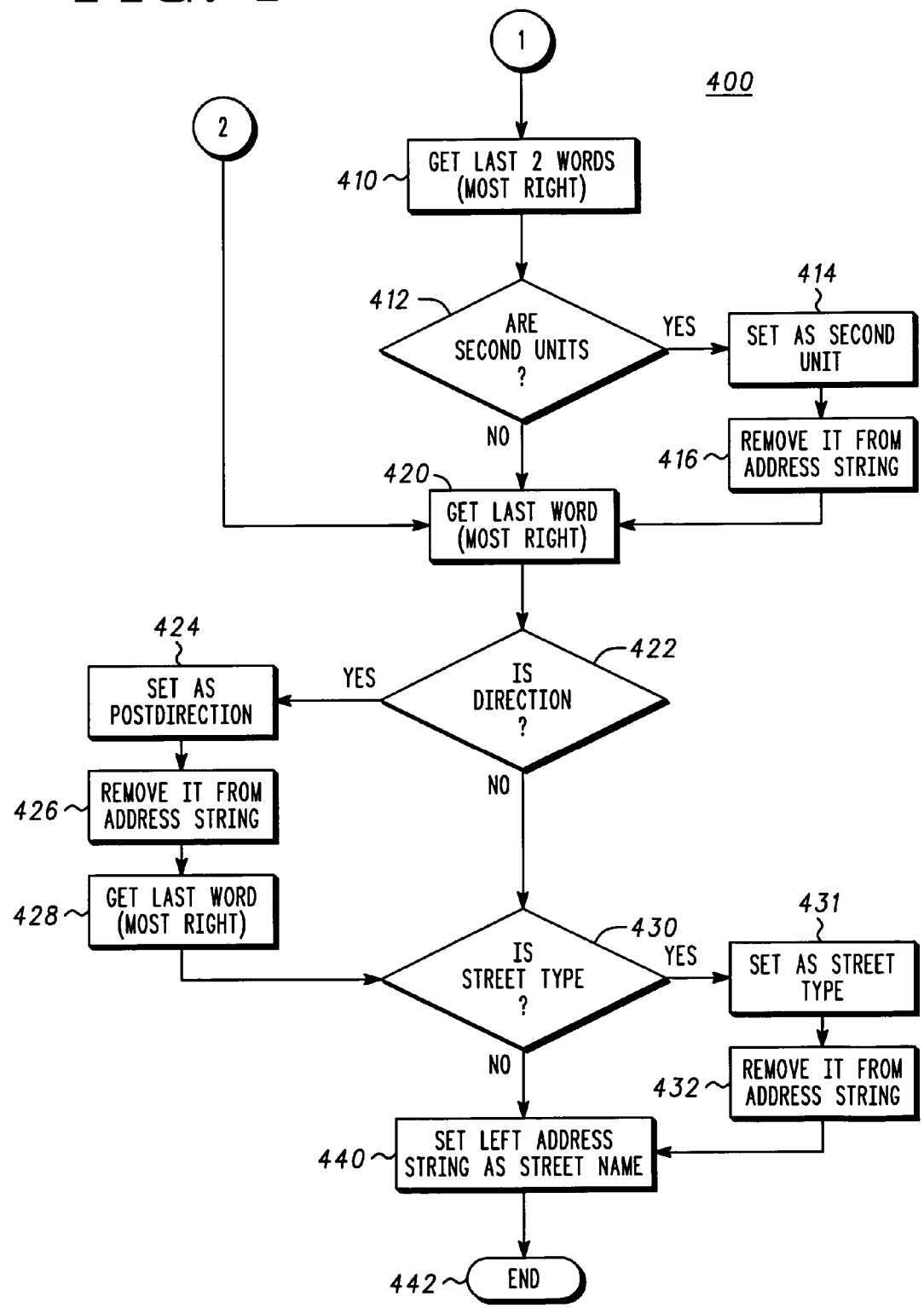
FIG. 4 is an exemplary decomposer process flow diagram related to FIG. 3.

If the determination at block 342 in FIG. 3 is negative, the process continues in FIG. 4 at block 410 where the last two words, for example the two rightmost words, are obtained. A determination is then made at block 412 as to whether they are a secondary unit. If so the secondary unit is set at block 414 and removed from the address string at block 416. At block 420, the last word, for example, the rightmost word is obtained. If there is direction as determined at block 422, the direction component is set as a post direction component at block 424 and it is removed from the address string at block 426. At block 428, the last word, for example, the rightmost word, is obtained. At block 430, if there is street type information, the street type information is set at block 430 and it is removed from the address string at block 432. The exemplary decomposing process continues at block 440 where the left address string is set as the street name. The exemplary process ends at block 442.

In FIG. 2, at the composing stage 240, the different components of the input location information are combined in various ways or combinations, thus generating multiple candidate locations based on the plurality of components or fields identified in or at the de-composing stage 230. The multiples composers 242, 244, 246 are representative of different combinations generated at the composing stage. The pre-processor shall be able to generate multiple alternative parsing results, and rank them.

The various combinations of components are also ranked according to some criteria, for example, based upon confidence or upon frequency or likelihood of use. In one embodiment, more highly ranked combinations are those that occur or are more likely to occur relatively frequently whereas the less highly ranked combinations are those that occur or are more likely to occur less frequently. The combinations ranked with higher confidence are geocoded first, as discussed further below.

In one exemplary embodiment, the following rules are followed for ranking alternative results produced or generated at the composer stage. First, the combinations having the greatest number of fields are ranked highest and used as a starting point for all following alterations. Any apostrophes or periods or other punctuation not removed from the street name field at the purifying stage are removed. If both pre-directional and post-directional information exists, the pre-directional portion is moved to the street name, and post-directional portions are moved as the pre-directional. Abbreviations are converted to unabbreviated. If street type exists, move street type to street name. If only post-directional information exists, it is moved to pre-directional. If only pre-directional information exists, it is moved to post-directional. If both pre-directional and post-directional exist, they are combined as pre-directional, e.g., "North" and "West" are combined as NorthWest.

For example, the input location information "175 West Point Street North" can be parsed into the following in descending ranks: "175" as house number, "West" as pre-directional, "Point" as street name, "Street" as street type, "North" as post-directional; "175" as house number, "North" as pre-directional, "West Point" as street name, "Street" as street type; "175" as house number, "North" as pre-directional, "Westpoint" as street name, "Street" as street type, or less likely but still possible; "175" as house number, "Northwest" as pre-directional, "Point" as street name, "Street" as street type.

In some embodiments, in FIG. 2 at the normalizing stage 250, the one or more candidate locations composed at the composing stage 240 are normalized relative to the reference location information in the geocoding base against which the candidate locations are compared, as discussed below. In one embodiment, the process identifies highway (numbered route) names in street name field and normalizes them into the format used in map data. The United States Postal Service also describes formats that may use for highway addresses. Other addressing schemes also exist, for example, "CR-" is used as a prefix for county roads, e.g., "CR-2288" for "County Road 2288", "FM-" is used as a prefix for farm roads, e.g., "FM-720" for "Farm Road 720", and "I-" is used as a prefix for interstate highways, "I-45" for "Interstate 45". Generally, "US-" is used as a prefix for US highways, e.g., US-87, and state abbreviations are used for state highways, e.g., IL-59. In some cases "HWY <n>" can also be used for US and state highways. In Colorado, "E-<n>" is used for some state highways.

In one embodiment, an address normalizer generates multiple ranked alternative results to handle inconsistencies in data. For example, the candidate combination "Highway 59" in Texas generated at composing stage 240 may be normalized to "TX-59", "US-59", "HWY 59", "CR-59", "FM-59", etc., and in descending rank. The address normalizer also may be able to map multiple names entered by the user to the same name in data. For example, "AZ-87" could be entered as: "Arizona state highway 87","AZ ST HWY 87", "HWY 87", "State HWY 87", "State Route 87", "AZ State 87", "SR 87", "State Road 87", "Beeline HWY N", "N Beeline HWY", etc. Additionally, the normalizer may lookup city names used in data for named places and neighborhood names, for example, Phoenix for Ahwatukee. These are merely examples of normalization functionality that is not intended to limit the disclosure.

Different embodiments may incorporate more or less of the exemplary stages, for example, in some applications where the numerical information is not processed, the pre-decomposing stage may be unnecessary. Also, in some embodiments, some or all of the functionality of the various processing stages may be combined with other stages, for example, in some embodiments some or all punctuation may be removed at the normalizing stage.

In FIG. 2 at geocoding block 260, after normalization, the location candidates are compared with information in a location information database. In embodiments where the candidates are ranked, the comparison occurs in the ranking order until matching one of the multiple candidate locations with information in the location information database. The functionality of the geocoding stage 260 is known generally by those of ordinary skill. The one or more processes preceding the geocoding stage 260 of FIG. 2 may be considered pre-processing stages.

Figure 5:
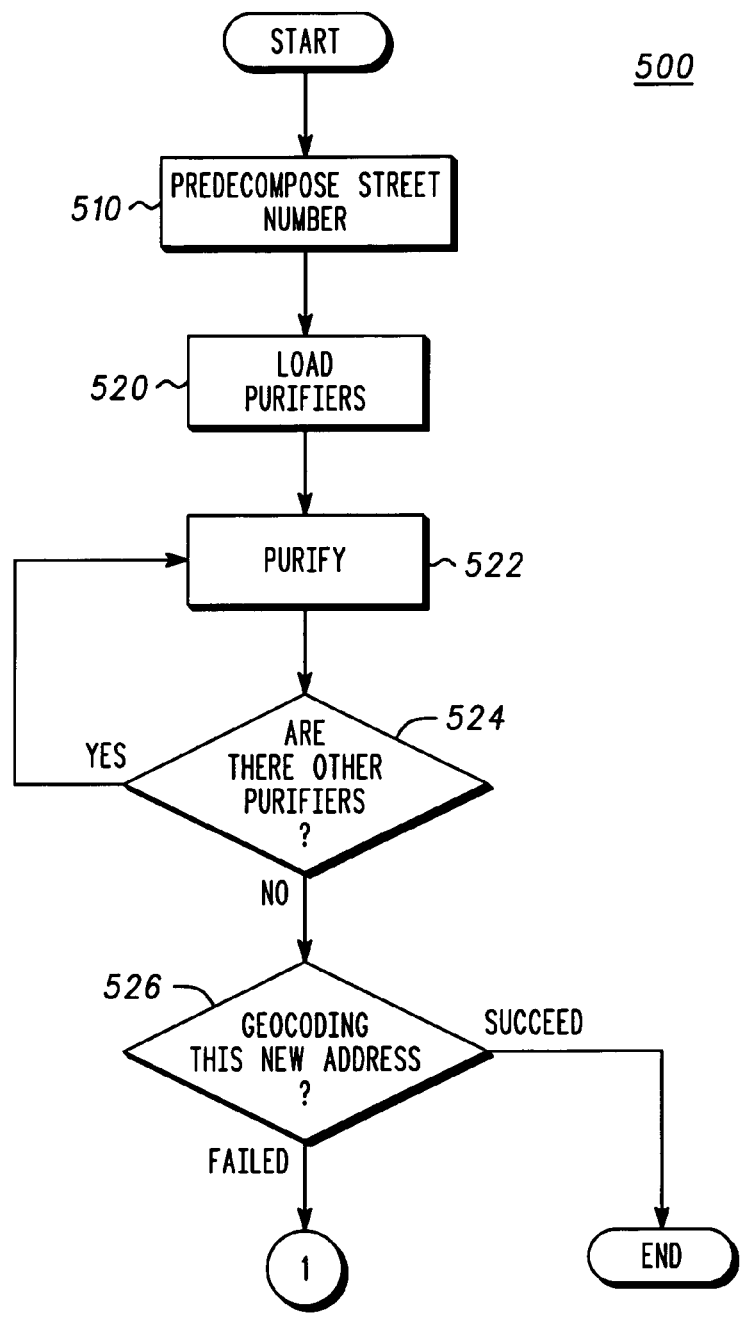
FIG. 5 is an exemplary geocoding process flow diagram.

In the geocoding process diagram of 500 FIG. 5, pre-decomposition occurs at block 510. Purifiers are loaded at block 520 and the pre-composed numerical and/or non-numerical components are subject to a purification process, as discussed above, in an iterative process controlled at block 524 until purification is complete. In some embodiments, upon completion of the pre-decomposing and purifying processes, the processed information is geocoded at block 526 as is know to those having ordinary skill in the art. Generally, the purified input location information is compared to or with reference map data until a match is made.

Figure 6:
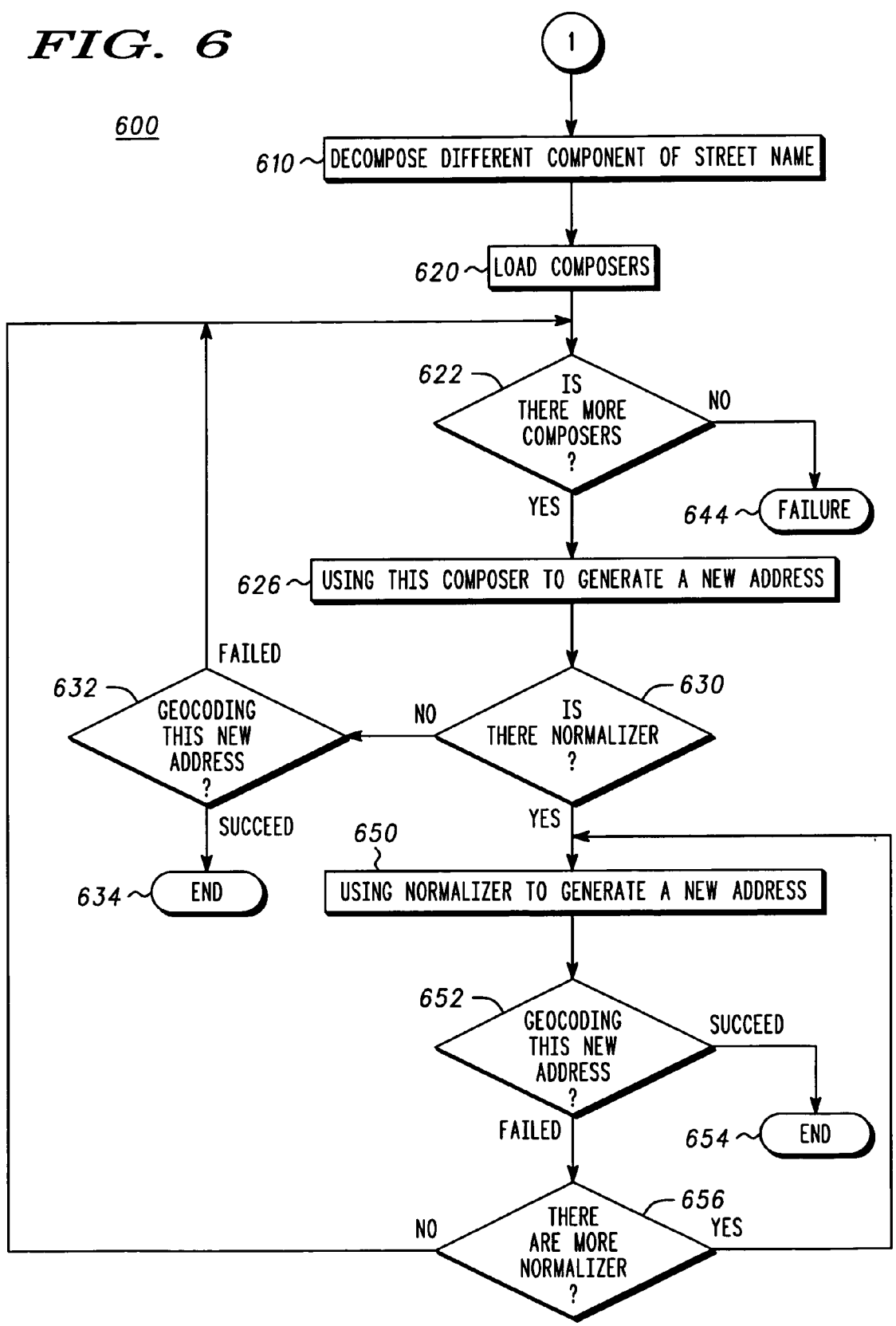
FIG. 6 is an exemplary geocoding process flow diagram related to FIG. 5.

In the exemplary process 600 of FIG. 6, decomposition occurs at block 610. At blocks 620 and 622, composers are loaded and new addresses are generated at block 626. At block 630, if there is no normalization, each new composition is geocoded at block 632 in an iterative process that either succeeds at block 634 or fails at block 644. If the compositions generated at 626 are to be normalized, as determined at block 630, normalization occurs at block 650. The normalized location information is geocoded at block 652. A successful geocoding process terminates at block 654, and an unsuccessful geocoding process iterates at block 656.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method of preprocessing user input location information before the user input information is translated to a specified format, the method comprising:
receiving user input location information for a particular location, the location information including a plurality of components;
generating multiple candidate locations based on the plurality of components;
comparing the multiple candidate locations with information in a location information database.

2. The method of claim 1, ranking the multiple candidate locations in a ranking order before comparing.

3. The method of claim 2, comparing the multiple candidates in the ranking order until matching one of the multiple candidate locations with information in the location information database.

4. The method of claim 1, removing information from the user input location information, the information removed not supported by the database location information.

5. The method of claim 1, identifying the components of the descriptive information before generating the multiple candidate locations.

6. The method of claim 1, generating the multiple candidate locations from combinations of the plurality of components.

7. The method of claim 1, normalizing at least one of the multiple candidate locations relative to the database location information.

8. A method in a geocoding entity coupled to a communication network, the method comprising:
receiving input location information for a particular location, the input location information including a plurality of components;
identifying components of the input location information;

generating multiple candidate locations from combinations of the components identified;

comparing the multiple candidate locations with reference location information until matching reference location information is found;

providing location information in a specified format based upon the matching reference location information.

9. The method of claim 8, ranking the multiple candidate locations in a ranking order before comparing.

10. The method of claim 8, the input information components includes number information and descriptive information, separating the number information from the descriptive information before generating the multiple candidate locations.

11. The method of claim 10, removing information from the input location information, the information removed not supported by the reference location information.

12. The method of claim 11, removing information includes removing punctuation from the input location information.

13. The method of claim 8, normalizing at least one of the multiple candidate locations relative to the reference location information before comparing the multiple candidate locations with the reference location information.

14. A method in a geocoding entity, the method comprising:

receiving input location information for a particular location, the input location information including a plurality of components;

identifying components of the input location information;

generating multiple candidate locations from combinations of the components identified;

comparing the multiple candidate locations with reference location information.

15. The method of claim 14, ranking the multiple candidate locations in a ranking order before comparing.

16. The method of claim 14, the input information components include number information and descriptive information, separating the number information from the descriptive information before generating the multiple candidate locations.

17. The method of claim 16, removing information from the descriptive information, the information removed not supported by the reference location information.

18. The method of claim 14, normalizing at least one of the multiple candidate locations relative to the reference location information before comparing the multiple candidate locations with the reference location information.

19. The method of claim 14, comparing the multiple candidate locations with the reference location information until matching reference location information is found, providing location information in a specified format based upon the matching reference location information.

* * * * *